(12) United States Patent
Myhre et al.

(10) Patent No.: US 10,521,251 B2
(45) Date of Patent: Dec. 31, 2019

(54) HOSTING APPLICATION EXPERIENCES WITHIN STORAGE SERVICE VIEWERS

(71) Applicant: Microsoft Technology Licensing, LLC, Redmond, WA (US)

(72) Inventors: Kirk Myhre, Redmond, WA (US); Can Comertoglu, Seattle, WA (US); Ryan Gregg, Redmond, WA (US); Edgar Banguero, Redmond, WA (US); David Michon, Redmond, WA (US); Daron Spektor, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 288 days.

(21) Appl. No.: 15/467,538

(22) Filed: Mar. 23, 2017

(65) Prior Publication Data
US 2018/0088968 A1 Mar. 29, 2018

Related U.S. Application Data

(60) Provisional application No. 62/399,296, filed on Sep. 23, 2016.

(51) Int. Cl.
 *G06F 9/451* (2018.01)
 *G06F 8/38* (2018.01)
(52) U.S. Cl.
 CPC ............... *G06F 9/452* (2018.02); *G06F 8/38* (2013.01)
(58) Field of Classification Search
 CPC .................................................. G06F 21/6218
 (Continued)

(56) References Cited

U.S. PATENT DOCUMENTS 8,640,093 B1 * 1/2014 Gill .................. G06Q 30/02
 717/120
9,280,613 B2 3/2016 Smith et al.
 (Continued)

FOREIGN PATENT DOCUMENTS

WO 2014092817 A1 6/2014

OTHER PUBLICATIONS

"Applying Third-Party Patches to Hosts", Retrieved on: Sep. 21, 2016, 2 pages. Available at: http://pubs.vmware.com/vsphere-50/index.jsp?topic=%2Fcom.vmware.vsphere.update_manager.doc_50%2FGUID-BBD753EE-6E80-40A6-A212-F7251B5ADF31.html.
(Continued)

*Primary Examiner* — Cao H Nguyen
(74) *Attorney, Agent, or Firm* — Newport IP, LLC; Scott Y. Shigeta

(57) ABSTRACT

The techniques disclosed herein provide hosted third-party application experiences within storage service viewers. Users can store a number of files having many different formats (AutoCAD files, word processing documents, spreadsheets, presentation files, and many files having unique formats) at a storage service. Users can view and edit the contents of a wide range of file formats by the use of a Web browser. The storage service can generate a display page that is configured to access viewing and editing tools from one or more remote services. The display page can also provide controls for the storage service, e.g., Dropbox controls, while concurrently providing the viewing and editing controls for select files. The viewing and editing tools can be provided by one or more remote services, such as a website managed by a third-party entity, such as Autodesk, Inc.

18 Claims, 6 Drawing Sheets

(58) Field of Classification Search
USPC .................................................. 715/763–765
See application file for complete search history.

(56) References Cited

U.S. PATENT DOCUMENTS

| | | | |
|---|---|---|---|
| 9,319,270 | B2 | 4/2016 | Bestmann et al. |
| 9,413,587 | B2 | 8/2016 | Smith et al. |
| 2008/0288582 | A1 | 11/2008 | Pousti et al. |
| 2010/0205196 | A1 | 8/2010 | Schreiber et al. |
| 2010/0286992 | A1 | 11/2010 | Tkatch et al. |
| 2012/0143817 | A1* | 6/2012 | Prabaker ............. G06F 21/6218 707/608 |
| 2012/0173612 | A1 | 7/2012 | Vegesna-Venkata et al. |
| 2014/0075338 | A1 | 3/2014 | Lifshitz et al. |
| 2014/0245253 | A1 | 8/2014 | Goldfeder |
| 2015/0310209 | A1 | 10/2015 | Zhang |

OTHER PUBLICATIONS

"Build your apps, your way", Retrieved on: Sep. 21, 2016, 3 pages. Available at: https://console.ng.bluemix.net/.

* cited by examiner

HOSTING APPLICATION EXPERIENCES WITHIN STORAGE SERVICE VIEWERS

CROSS REFERENCE TO RELATED APPLICATION

This patent application claims the benefit of U.S. Provisional Patent Application Ser. No. 62/399,296 filed Sep. 23, 2016, entitled "HOSTING APPLICATION EXPERIENCES WITHIN STORAGE SERVICE VIEWERS," which is hereby incorporated in its entirety by reference.

BACKGROUND

There are a number of storage services that allow users to store and share personal files. Such services also allow users to access the files from nearly any device connected to the Internet. There are a number of benefits of such services. However, there are also some areas of improvement when it comes to the user experience.

Storage services typically store thousands of different types of files. For example, files can be stored in a Word format, PDF format, TIFF format, JPEG format, Project format, to name a few. When users have a wide range of files types it may not always be easy to view and edit the contents of the files, particularly when the user is interacting with the storage service through a Web browser. In fact, when using a Web-based interface, the options for viewing the contents of cloud-stored files is typically limited to generic image files, such as GIF and JPG files. Some storage services also provide tools for viewing the contents of PDF files. However, when it comes to viewing the contents of non-generic file types using a Web-based interface, users are often forced to download a file and use a locally installed application to view and edit such files. This situation diminishes the value of using a central storage service since the user is limited to computers that have the specialized software for viewing such files. In one specific example, a user cannot readily use a browser on their phone to view, much less edit, the contents of some files having a less generic format, such as an AutoCAD DWG file stored with an online storage service. Examples of online storage services include, but are not limited to, Google Drive, OneDrive, and Dropbox.

It is with respect to these and other considerations that the disclosure made herein is presented.

SUMMARY

The techniques disclosed herein provide hosted third-party application experiences within storage service viewers. Users can store a number of files having many different formats at a storage service. For instance, users can store image files, AutoCAD files, word processing documents, spreadsheets, presentation files, and many files having unique formats with an online storage service. The techniques disclosed herein enable users to view and edit the contents of a wide range of file formats by the use of a Web browser. The storage service can generate a display page that is configured to access viewing and editing tools from one or more remote services. The display page can also provide storage service specific controls, e.g. file navigation controls, file sharing controls, etc., while concurrently providing the viewing and editing controls for select files. The viewing and editing tools can be provided by one or more remote services, such as a website managed by a third-party entity, such as Autodesk, Inc or another entity providing tools for a particular file type. The viewing and editing tools can be customized to enable users to view and edit specialized file formats, such as AutoCAD files, on the display page provided by the storage service. The techniques disclosed herein enable users to view and edit a wide range of file formats while staying on one Webpage hosted by the storage service. Such features enhance user's efficiency and improve user interaction with a computing device. In addition, the features disclosed herein also enable a storage service to provide a more robust viewing experience for users while enabling users to stay on one Website to view and edit many different types of files.

In one illustrative example, a system managed by a storage service, such as Dropbox, can store a plurality of files associated with a user identity having permissions to share and access the plurality of files. Each file can be associated with a file type. The system can then determine an association between a given file type and an interface address of a remote service. For instance, the system may associate all AutoCAD files with a URL provided by a remote service, such as Autodesk, Inc.

The system can then receive a command to view and edit the contents of the at least one file associated with a file type. The system can then cause the communication of the file from a computing system to the remote service. The system can then generate display page data comprising interface definitions for a display page (referred to herein as a "storage service viewer") having a details bar and a command bar and other controls. In some configurations, the display page data comprises the interface address for causing a client computing device, e.g., an end-user's device, to receive the viewer page from the remote service. The display page data can be configured to display the viewer page in proximity to the details bar and the command bar. The system can communicate the display page data to the client computing device to cause the client computing device to render the display page on a display device. The client computing device can query the remote service utilizing the interface address. The client computing device receives the viewer page data from the remote service in response to the query, and displays the viewer page showing the contents of the at least one file in proximity to the details bar and the command bar.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
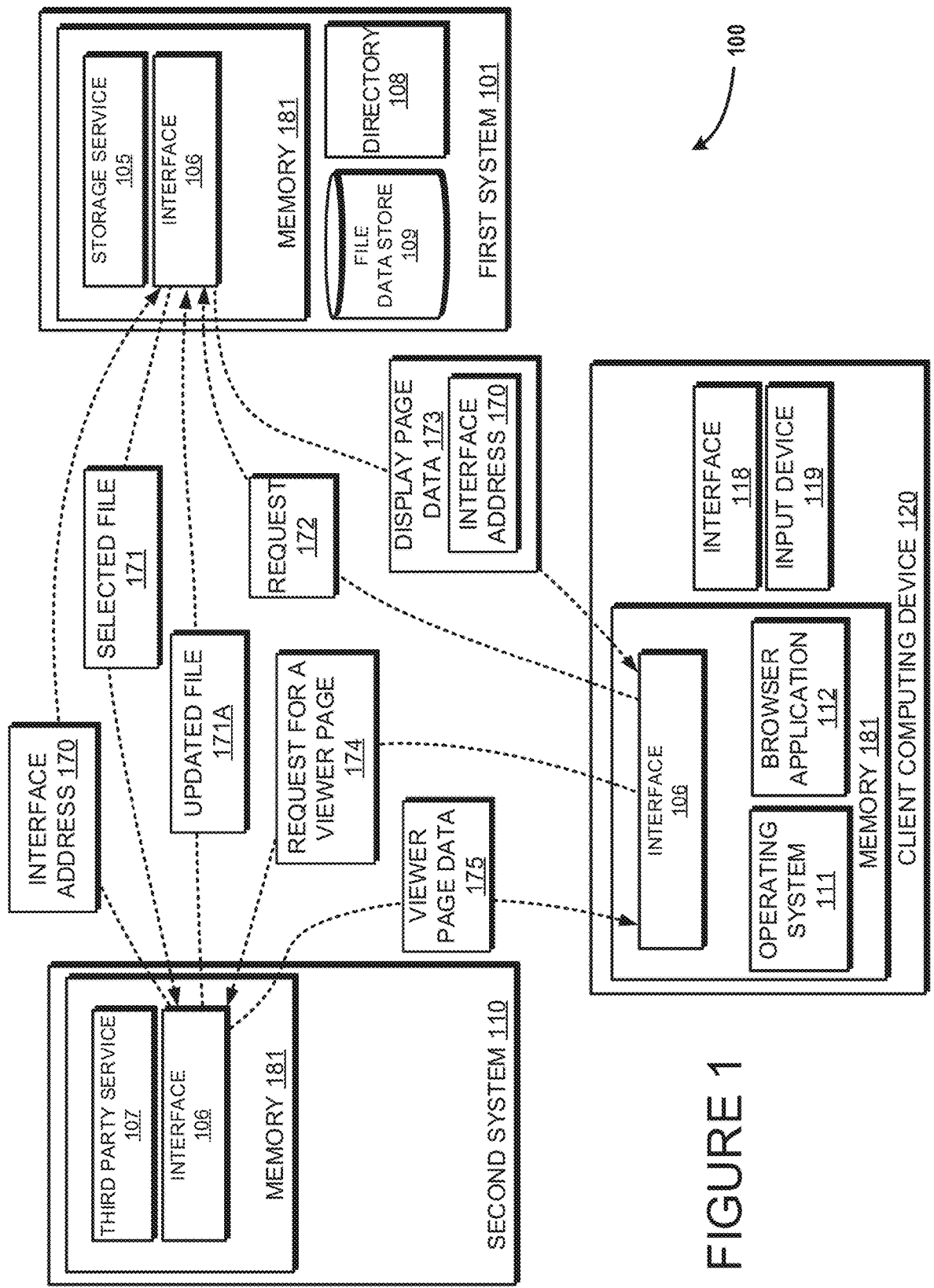
FIG. 1 illustrates an example computing device for providing hosted third-party application experiences within storage service viewers.

The techniques disclosed herein provide hosted third-party application experiences within storage service viewers. Users can store a number of files having many different formats at a storage service. For instance, users can store image files, AutoCAD files, word processing documents, spreadsheets, presentation files, and many files having unique formats with an online storage service. The techniques disclosed herein enable users to view and edit the contents of a wide range of file formats by the use of a Web browser. The storage service can generate a display page that is configured to access viewing and editing tools from one or more remote services. The display page can also provide storage service-specific controls, e.g. file navigation controls, file sharing controls, etc., while concurrently providing the viewing and editing controls for select files. The viewing and editing tools can be provided by one or more remote services, such as a website managed by a third-party entity, such as Autodesk, Inc. The viewing and editing tools can be customized to enable users to view and edit specialized file formats, such as AutoCAD files, on the display page provided by the storage service. The techniques disclosed herein enable users to view and edit a wide range of file formats while staying on one Webpage hosted by the storage service. Such features enhance user's efficiency and improve user interaction with a computing device. In addition, the features disclosed herein also enable a storage service to provide a more robust viewing experience for users while enabling users to stay on one Website to view many different types of files.

In one illustrative example, a system managed by a storage service, such as Dropbox, can store a plurality of files associated with a user identity having permissions to share and access the plurality of files. Each file can be associated with a file type. The system can then determine an association between a given file type and an interface address of a remote service. For instance, the system may associate all AutoCAD files with a URL provided by a remote service, such as Autodesk, Inc.

The system can then receive a command to view and edit the contents of the at least one file associated with a file type. The system can then cause the communication of the file from a computing system to the remote service. The system can then generate display page data comprising interface definitions for a display page (referred to herein as a "storage service viewer") having a details bar and a command bar and other controls. In some configurations, the display page data comprises the interface address for causing a client computing device, e.g., an end-user's device, to receive the viewer page from the remote service. The display page data can be configured to display the viewer page in proximity to the details bar and the command bar. The system can communicate the display page data to the client computing device to cause the client computing device to render the display page on a display device. The client computing device can query the remote service utilizing the interface address. The client computing device receives the viewer page data from the remote service in response to the query, and displays the viewer page showing the contents of the at least one file in proximity to the details bar and the command bar.

It should be appreciated that the above-described subject matter may be implemented as a computer-controlled apparatus, a computer process, a computing system, or as an article of manufacture such as a computer-readable storage medium. Among many other benefits, the techniques herein improve efficiencies with respect to a wide range of computing resources. For instance, human interaction with a device may be improved as the use of the techniques disclosed herein enable a user to view a wide range of file types while staying on one Website. In addition, improved human interaction improves other computing resources such as processor and network resources, e.g., users can stay on one Website and reduce interaction, traffic and computer cycles. Other technical effects other than those mentioned herein can also be realized from implementations of the technologies disclosed herein.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for enabling hosted third-party application experiences within storage service viewers. As will be described in more detail below with respect to FIGS. 4, 5, and 6, there are a number of applications and modules that can embody the functionality and techniques described herein.

Referring to FIG. 1, an example system 100 for providing hosted third-party application experiences within storage service viewers is shown and described below. This illustrative example comprises a first computing system 101 hosting a storage service 105, a second computing system 110 hosting a third-party service 107, and a client computing device 120.

The first computing system 101 is configured to store a plurality of files associated with a user identity having permissions to share and access select files. The first computing system 101 can comprise a directory 108 and a file data store 109. The directory 108 can enable the storage service 105 to maintain records of user credentials and access rights. The file data store 109 can be used to store a plurality of files having a wide range of file types. Users of the storage service 105 can provide credentials to gain access to files associated with their identity. The storage service 105 can be managed by an individual or a business entity. Examples of storage services include Google Drive, OneDrive, and Dropbox.

The second computing system 110 can include a third-party service 107 configured to manage and process files having a particular file type. As will be described in more detail below, the third-party service 107 can be configured to generate viewer page data 175 that provides a Web-based user interface through a client application, such as a browser application 112 executing on the client computing device 120. The Web-based user interface provided by the third-party service 107 can enable users to view, edit, and otherwise process files that are stored on, and provided by, the storage service 105 of the first computing system 101. The third-party service 107 can be managed by an individual or a business entity. For example, the third-party service 107 can be provided by companies like Adobe, Apple, Autodesk, or any other company that provides software for a particular file type.

The first computing the system 101 and the second computing system 110 (collectively referred to as "computing systems") can each be individual computers or a number of computers configured to perform aspects of the techniques described herein. The computing systems may include memory 181 for storing and enabling the execution of one or more services (105 and 107) that receive, process, and manage data described herein and other data.

The client computing device 120 may be any type of computing device, such as a mobile phone, a tablet computer, a server, a laptop computer, or a desktop computer. The client computing device 120 may include a display interface 118 for displaying data, such as renderings from the browser application 112. The client computing device 120 also includes an input device 119 for receiving input from a user. The display interface 118 may be a touch-sensitive display screen that is operable to display images and/or video data, and also operable to receive input from the user, input that may involve a touch signal that indicates an input gesture. The client computing device 120 may also include memory 181 storing programs and other data, such as an operating system 111 and the browser application 112. The computing systems and the client computing device 120 can each comprise an interface 106 which may be in the form of an application programming interface (API) configured to send and receive data between the devices.

In some configurations, users can view files stored on the storage service 105 by the use of an application, such as the browser application 112 executing on the client computing device 120. The stored service 105 can create a user environment through the browser application 112. In such an environment, the user can view a list of filenames, or graphical representations of files, e.g., icons or thumbnails, along with other graphical elements and controls enabling the user to view attributes related to the files and control aspects of the storage service. For example, users can view a file size, file type, a last modified date, etc. Users can also delete, download, or upload files. For some file types, such as JPEG, PDF and other common file types, some existing storage services enable users to view the contents of stored files. When it comes to obscure or specialized file types, e.g., LATEX files, AutoCAD DWG files, and other file types, the techniques disclosed herein provide a number of features to enable a Web-based view of the contents of such files within the user environment that is managed by the storage service 105.

To enables aspects of the techniques disclosed herein, an initialization stage may be utilized. In some configurations, the first computing system 101 can determine an association between a file type and an interface address 170 of a third-party service. An association between a file type and an interface address 170 can be determined in a number of ways. For instance, the first computing system 101 can provide one or more interfaces 106, e.g., API's, for allowing credible third-party companies to provide initialization data. In such a scenario, a service, such as the second system 110, can provide an interface address 170 and data associating the interface address 170 with a file type. In another example, the initialization data may be configured by a user. In such configurations, the user may associate a particular file type with an interface address 170.

The initialization data may associate a file type with a particular interface address 170. In one illustrative example, Adobe may provide initialization data to indicate that an Adobe Illustrator file, having an extension ".AI," is associated with a particular interface address 170, which may be in the form of a URL directed to an Adobe service. In another example, Autodesk may provide initialization data to indicate that an AutoCAD file, having an extension ".DWG," is associated with a particular interface address 170, which may be in the form of a URL, directed to an Autodesk service. The interface address 170 can be configured to enable a computer, such as the client computing device 120, to access a viewer page directly from the third-party service 107. As will be described in more detail below, the viewer page can display the contents of one or more selected files.

In standard user mode, the storage service 105 can provide a list of stored files via a Webpage. When a user desires to view the contents of a selected file 171, the user can select a file from the list and send a request 172 identifying the selected file 171. The request can be sent from the client computing device 122 to the storage service 105. For illustrative purposes, consider an example where the user selects an AutoCAD Illustrator file having an ".DWG" extension.

In response to receiving the request 172 to view the contents of the selected file, the storage service 105 communicates the selected file 171 to the third-party service 107 of the second computing system 110. The communication of the selected file 171 to the second computing system 110 enables the third-party service 107 to perform a number of operations on the selected file 171. Among other functionality, the third-party service 107 can be configured to modify and store the selected file 171. In addition, the third-party service 107 can generate viewer page data 175 defining a Web-based user interface capable of displaying the contents of the selected file 171. The Web-based user interface (also referred to herein as a "viewer page") is accessible by the use of the interface address 170. In the above example involving the AutoCAD file, the interface address 170 may include a URL directed to www.autodesk.com.

Figure 2:
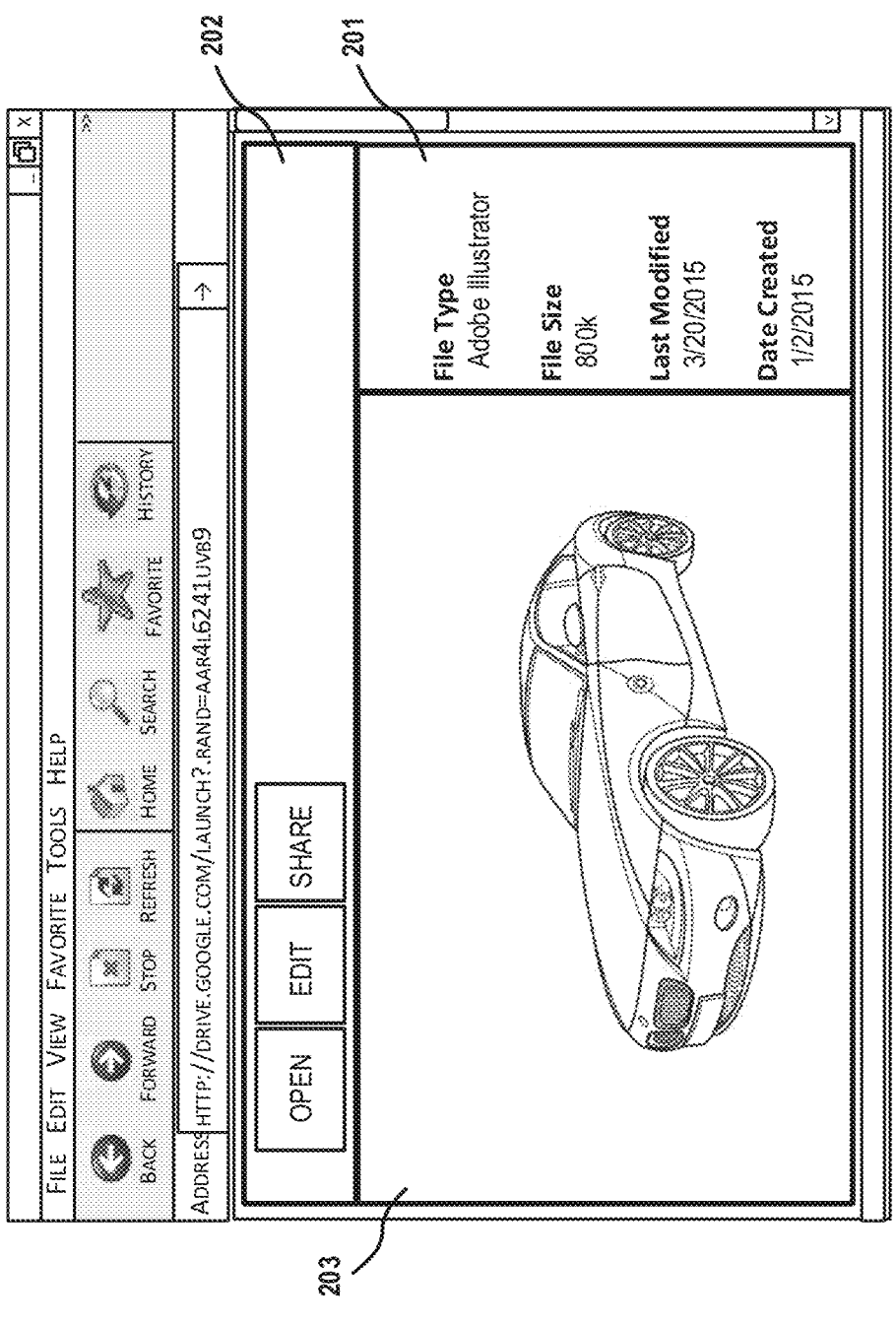
FIG. 2 illustrates an example storage service viewer.

In addition, in response to the request 172, the storage service 105 generates display page data 173 defining a display page (200 of FIG. 2). In some configurations, the display page can include interface definitions for a details bar and a command bar. As will be described below, the details bar can provide various attributes related to a selected file 171. The command bar can include user interface elements configured to receive commands for modifying, communicating and otherwise processing the selected file 171.

In some configurations, the display page data 173 includes the interface address 170. When the display page data 173 and the interface address 170 are communicated to the client device 120, the client device 120 can display graphical elements of the display page, e.g., the details bar and the command bar. In addition, the interface address 170 enables the client computing device 120 to send a request 174 for a viewer page from the third-party service 107. In response to the request 174, the third-party service 107 communicates viewer page data 175 to the client computing device 120. The viewer page data 175 is configured to display the contents of the selected file 171 within a predetermined region of the display page. In some configurations, the request 174 or another communication can also include an instruction to modify a file stored at the third-party service 107.

In some configurations, the display page data 173 is configured to display the viewer page along with, e.g., concurrently with, the display of the command bar and the details bar. This configuration enables the hosted third-party application experiences within storage service viewers. In some configurations, the command bar and the details bar can be in proximity to one another, e.g., in positions enabling users to readily view both the command bar and the details bar. The command bar and the details bar can be in a side-by-side arrangement.

In some configurations, the storage service 105 can receive an updated version 171A of the file from the second system, e.g., the remote service. The storage service 105 can also store the updated version of the file 171A in a file data store 109 associated with the storage service 105, which can be part of a computing system such as the first system 101. In some configurations, the updated version of the file 171A is received from the remote service in response to a modification of the file, wherein the modification of the file is caused by an edit command initiated by the client computing device.

FIG. 2 illustrates a representative example of a display page 200 (also referred to herein as a "storage service viewer 200") that is generated from the display page data 173. In this example, the display page data 173 comprises code defining a details bar 201 and a command bar 202. As shown, the details bar 201 can display attributes of the selected file 171, such as the file size, modify date, creation date, etc. The command bar 202 can provide one or more controls for manipulating, communicating, or otherwise processing the selected file 171. For instance, the command bar 202 can comprise an "open" button, an "edit" button, and a "share" button.

Also shown in FIG. 2, the display page 200 comprises a region for displaying the contents of the selected file 171. In this illustrative example, the contents of the selected file 171 includes an image of a car. As summarized above, this region is referred to herein as the viewer page 203. Although the rendering of the viewer page 203 is based on the viewer page data 175 provided by the third-party service 107, the display page data 173 is configured to define display properties of the viewer page 203. The properties can define, for instance, a size, orientation, and position of the viewer page 203. Such properties enable the hosted third-party application experience within storage service viewer.

As summarized above, the display page data 173 also includes the interface address 170 and other supporting code for enabling the client computing device 122 to send a request 174 to the third-party service 107 for the viewer page data 175. The third-party service 107 then communicates the viewer page data 175 to the client computing device 120 causing a display of the contents of the selected file 171 in the viewer page 203 area. As shown, the viewer page 203 is displayed in the same user environment as the details bar 201 and the command bar 202. The viewer page data 175 is and/or the display page data 173 is configured to display the viewer page 203 in proximity to the data provided by the storage service 105, which may include file properties, statistics and/or controls displayed in the details bar 201 and the command bar 202.

Since the viewer page 203 is controlled by the third-party service 107, user interaction with the viewer page 203 can allow a user to send commands to the third-party service 107 for modifying the selected file 171. In addition, by interacting with the viewer page 203, a user can issue commands for the third-party service 107 to save updates to the selected file 171 at the stored service 105.

Figure 3:
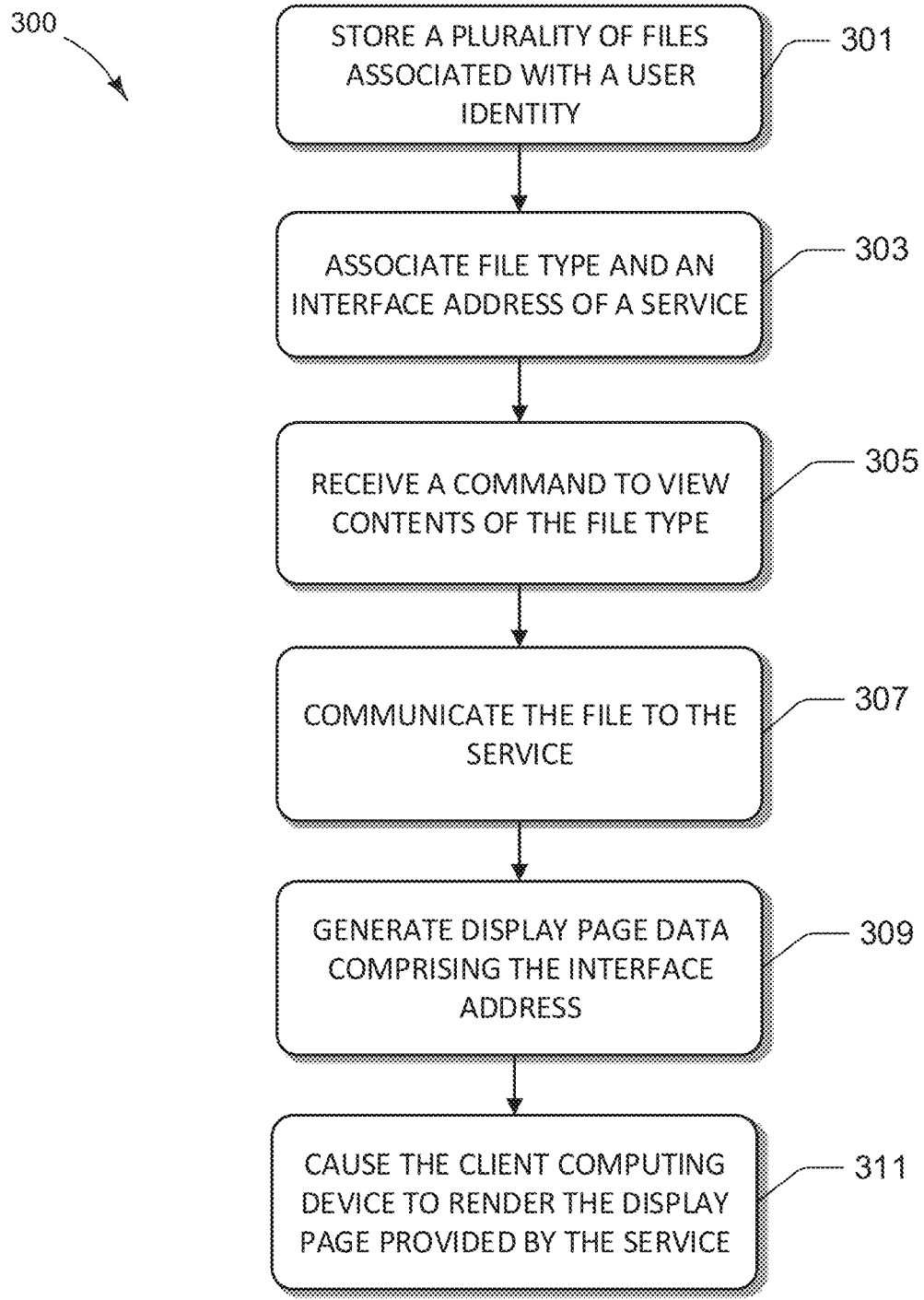
FIG. 3 is a flow diagram showing a routine for providing hosted third-party application experiences within storage service viewers.

Turning now to FIG. 3, aspects of a routine 300 for enabling hosted third-party application experiences within storage service viewers are shown and described. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 300 are described herein as being implemented, at least in part, by an application, component and/or circuit, such as the storage service 105, which is also referred to herein as a "storage service module 105." In some configurations, the storage service 105 can be a dynamically linked library (DLL), a statically linked library, functionality produced by an application programing interface (API), a compiled program, an interpreted program, a script or any other executable set of instructions. Data and/or modules described herein, such as the display page data 173 and the storage service 105, can be stored in a data structure in one or more memory components. Data can be retrieved from the data structure by addressing links or references to the data structure.

Although the following illustration refers to the components of FIG. 1 and FIGS. 4, 5, and 6, it can be appreciated that the operations of the routine 300 may be also implemented in many other ways. For example, the routine 300 may be implemented, at least in part, by a processor of another remote computer or a local circuit. In addition, one or more of the operations of the routine 300 may alternatively or additionally be implemented, at least in part, by a chipset working alone or in conjunction with other software modules. Any service, circuit or application suitable for providing the techniques disclosed herein can be used in operations described herein.

With reference to FIG. 3, the routine 300 begins at operation 301, where the storage service module 105 stores a plurality of files associated with a user identity having permissions to share and access the plurality of files. Each file can be in a file type. Next, at operation 303, the storage service module 105 can determine an association between a given file type and an interface address of a remote service. For instance, the system may associate all AutoCAD files with a URL provided by a remote service, such as Autodesk, Inc.

Next, at operation 305, the storage service module 105 receives a command to view and edit the contents of the at least one file associated with a file type. The command can be from any type of input or signal or data provided by a computing device. For instance, a command can be an input command provided by a user actuating a graphical user interface element, such as a control on a web page. The input command can also be a voice command, a gesture or any other type of input provided by user. The input command can also come from a remote computer or a local computing module.

At operation 307, the storage service module 105 can cause the communication of the file from a computing system to the remote service. For instance, a file identified in the input command, a selected file, can be communicated from the storage service to the second system 110 of FIG. 1.

At operation 309, the storage service module 105 can generate display page data comprising interface definitions for a display page. In some configurations, the display page data can define a display page having a details bar and a command bar and other controls. In some configurations, the display page data comprises the interface address for causing a client computing device, e.g., an end-user's device, to receive the viewer page from the remote service. The display page data can be configured to display the viewer page in proximity to the details bar and the command bar.

At operation 311, the storage service module 105 communicates the display page data to the client computing device to cause the client computing device to render the display page on a display device. The client computing device can query the remote service utilizing the interface address. The client computing device receives the viewer page data from the remote service in response to the query, and displays the viewer page showing the contents of the at least one file in proximity to the details bar and the command bar.

Figure 4:
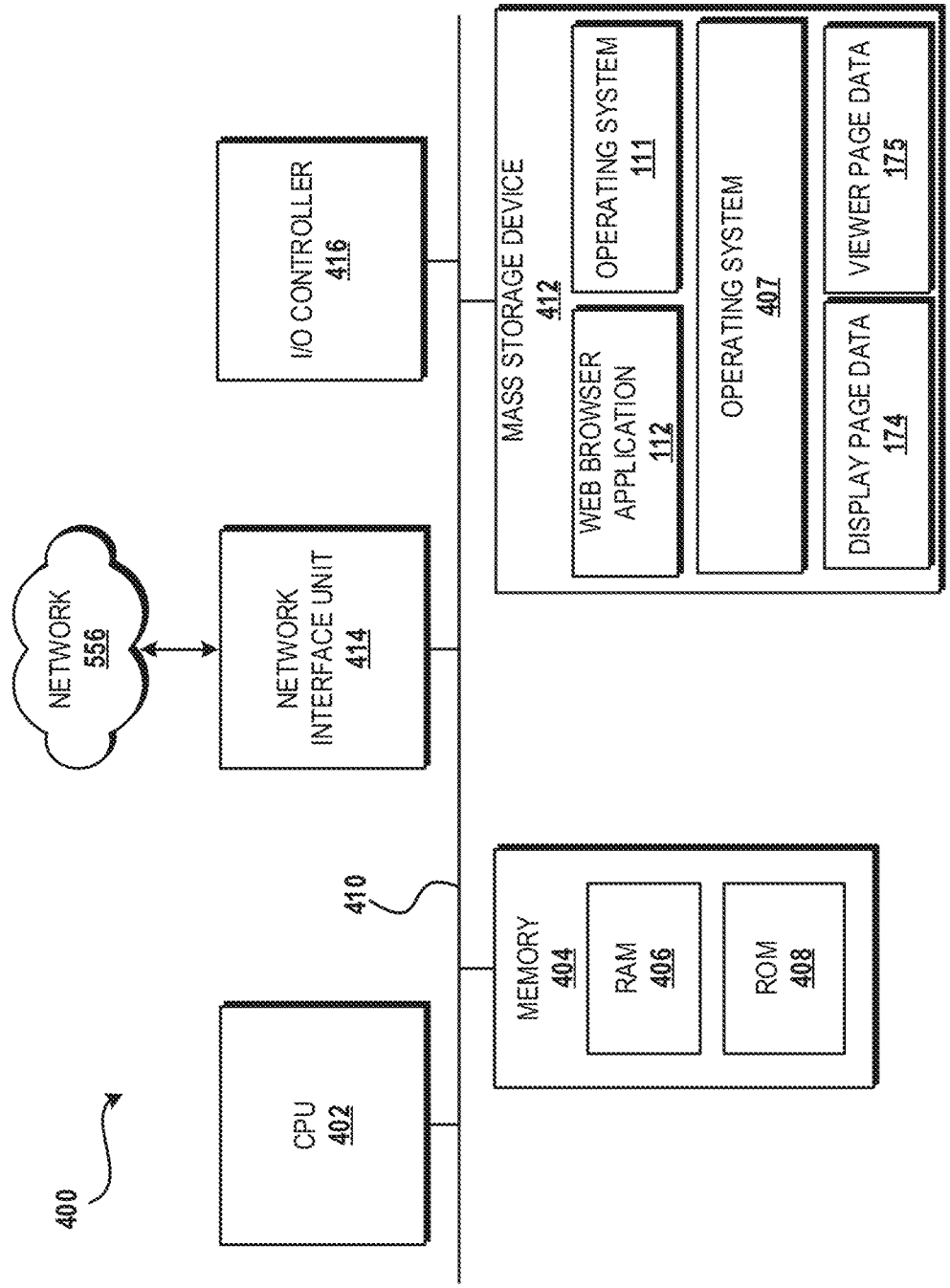
FIG. 4 is a computer architecture diagram illustrating an illustrative computer hardware and software architecture for a computing system capable of implementing aspects of the techniques and technologies presented herein.

FIG. 4 illustrates an illustrative computer architecture 400 for a device capable of executing the software components described herein for providing hosted third-party application experiences within storage service viewers. Thus, the computer architecture 400 illustrated in FIG. 4 illustrates an architecture for a server computer, mobile phone, a PDA, a smart phone, a desktop computer, a netbook computer, a tablet computer, and/or a laptop computer. The computer architecture 400 may be utilized to execute any aspects of the software components presented herein.

The computer architecture 400 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing an operating system 407, and one or more application programs including, but not limited to, the operating system 111 and the web browser application 112. The illustrated mass storage device 412 may also store the viewer page data 175 and the display page data 174.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes the claims, the phrase "computer storage medium," "computer-readable storage medium" and variations thereof, does not include waves, signals, and/or other transitory and/or intangible communication media, per se.

According to various configurations, the computer architecture 400 may operate in a networked environment using logical connections to remote computers through the network 556 and/or another network (not shown). The computer architecture 400 may connect to the network 556 through a network interface unit 414 connected to the bus 410. It should be appreciated that the network interface unit 414 also may be utilized to connect to other types of networks and remote computer systems. The computer architecture 400 also may include an input/output controller 416 for receiving and processing input from a number of other devices, including a keyboard, mouse, or electronic stylus (not shown in FIG. 4). Similarly, the input/output controller 416 may provide output to a display screen, a printer, or other type of output device (also not shown in FIG. 4).

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. It is also contemplated that the computer architecture 400 may not include all of the components shown in FIG. 4, may include other components that are not explicitly shown in FIG. 4, or may utilize an architecture completely different than that shown in FIG. 4.

Figure 5:
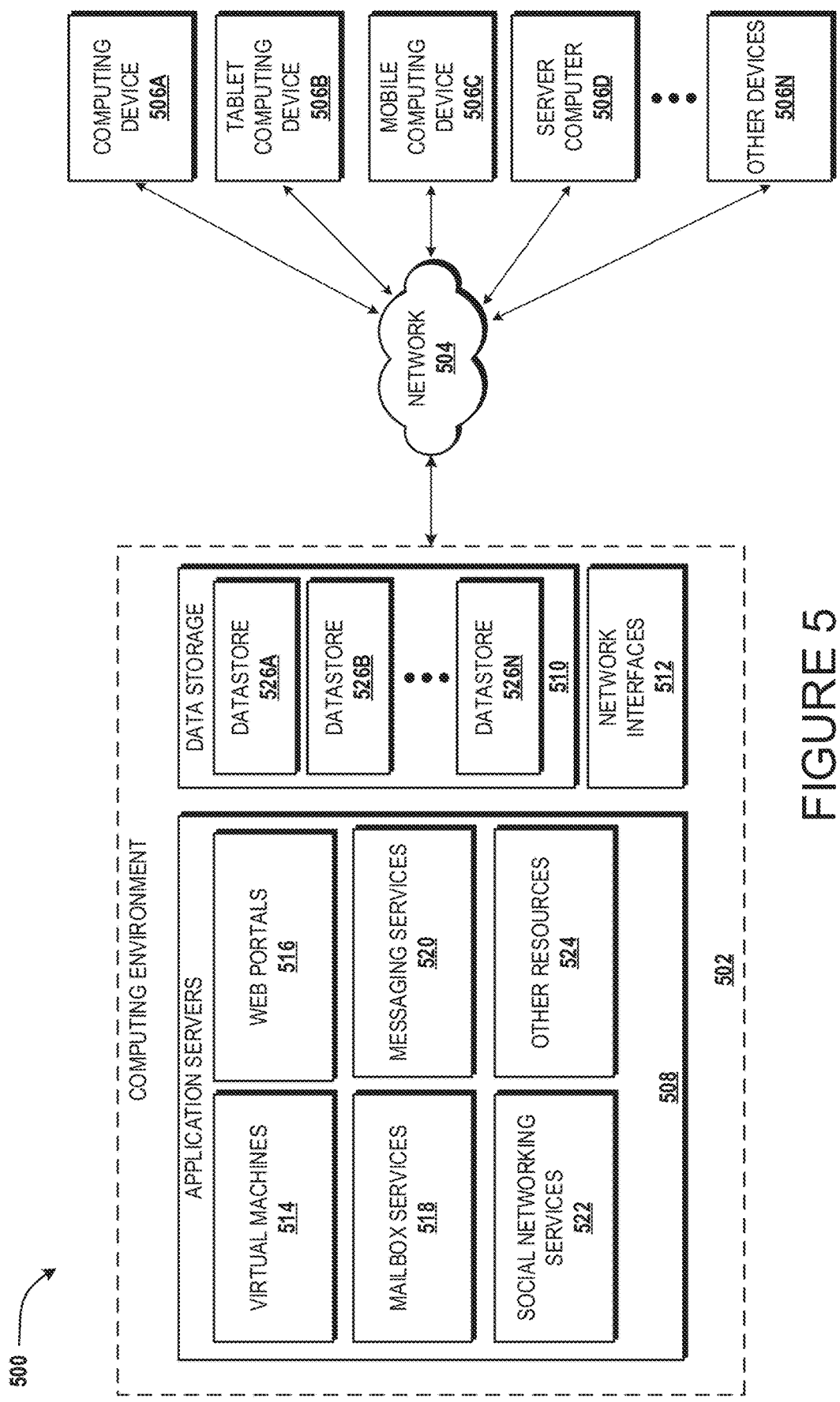
FIG. 5 is a diagram illustrating a distributed computing environment capable of implementing aspects of the techniques and technologies presented herein.

FIG. 5 depicts an illustrative distributed computing environment 500 capable of executing the software components described herein for providing hosted third-party application experiences within storage service viewers, among other aspects. Thus, the distributed computing environment 500 illustrated in FIG. 5 can be utilized to execute any aspects of the software components presented herein. For example, the distributed computing environment 500 can be utilized to execute aspects of the operating system 111 and/or other software components described herein.

According to various implementations, the distributed computing environment 500 includes a computing environment 502 operating on, in communication with, or as part of the network 504. The network 504 may be or may include the network 556, described above with reference to FIGS. 4 and 6. The network 504 also can include various access networks. One or more client devices 506A-506N (hereinafter referred to collectively and/or generically as "clients 506") can communicate with the computing environment 502 via the network 504 and/or other connections (not illustrated in FIG. 5). In the illustrated configuration, the clients 506 include a computing device 506A such as a laptop computer, a desktop computer, or other computing device; a slate or tablet computing device ("tablet computing device") 506B; a mobile computing device 506C such as a mobile telephone, a smart phone, or other mobile computing device; a server computer 506D; and/or other devices 506N. It should be understood that any number of clients 506 can communicate with the computing environment 502. Two example computing architectures for the clients 506 are illustrated and described herein with reference to FIGS. 3 and 5. It should be understood that the illustrated clients 506 and computing architectures illustrated and described herein are illustrative, and should not be construed as being limited in any way.

In the illustrated configuration, the computing environment 502 includes application servers 508, data storage 510, and one or more network interfaces 512. According to various implementations, the functionality of the application servers 508 can be provided by one or more server computers that are executing as part of, or in communication with, the network 504. The application servers 508 can host various services, virtual machines, portals, and/or other resources. In the illustrated configuration, the application servers 508 host one or more virtual machines 514 for hosting applications or other functionality. According to various implementations, the virtual machines 514 host one or more applications and/or software modules for providing hosted third-party application experiences within storage service viewers. It should be understood that this configuration is illustrative, and should not be construed as being limiting in any way. The application servers 508 also host or provide access to one or more Web portals, link pages, Web sites, and/or other information ("Web portals") 516.

According to various implementations, the application servers 508 also include one or more mailbox services 518 and one or more messaging services 520. The mailbox services 518 can include electronic mail ("email") services. The mailbox services 518 also can include various personal information management ("PIM") services including, but not limited to, calendar services, contact management services, collaboration services, and/or other services. The messaging services 520 can include, but are not limited to, instant messaging services, chat services, forum services, and/or other communication services.

The application servers 508 also may include one or more social networking services 522. The social networking services 522 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 522 are provided by or include the FACEBOOK social networking service, the LINKEDIN professional networking service, the YOUTUBE media service, the FOURSQUARE geographic networking service, the YAMMER office colleague networking service, and the like. In other configurations, the social networking services 522 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 522 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 522 are not mentioned herein for the sake of brevity. As such, the above configurations are illustrative, and should not be construed as being limited in any way. According to various implementations, the social networking services 522 may host one or more applications and/or software modules for providing the functionality described herein for providing hosted third-party application experiences within storage service viewers.

As shown in FIG. 5, the application servers 508 also can host other services, applications, portals, and/or other resources ("other resources") 524. The other resources 524 can include, but are not limited to, the presentation application program. It thus can be appreciated that the computing environment 502 can provide integration of the concepts and technologies disclosed herein provided herein with various mailbox, messaging, social networking, and/or other services or resources.

As mentioned above, the computing environment 502 can include the data storage 510. According to various implementations, the functionality of the data storage 510 is provided by one or more databases operating on, or in communication with, the network 504. The functionality of the data storage 510 also can be provided by one or more server computers configured to host data for the computing environment 502. The data storage 510 can include, host, or provide one or more real or virtual datastores 526A-526N (hereinafter referred to collectively and/or generically as "datastores 526"). The datastores 526 are configured to host data used or created by the application servers 813 and/or other data.

The computing environment 502 can communicate with, or be accessed by, the network interfaces 512. The network interfaces 512 can include various types of network hardware and software for supporting communications between two or more computing devices including, but not limited to, the clients 506 and the application servers 508. It should be appreciated that the network interfaces 512 also may be utilized to connect to other types of networks and/or computer systems.

It should be understood that the distributed computing environment 500 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 500 provides the software functionality described herein as a service to the clients 506. It should be understood that the clients 506 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 500 to utilize the functionality described herein for providing hosted third-party application experiences within storage service viewers. In one specific example, as summarized above, techniques described herein may be implemented, at least in part, by the web browser application 112, which works in conjunction with the application servers 508 of FIG. 5.

Figure 6:
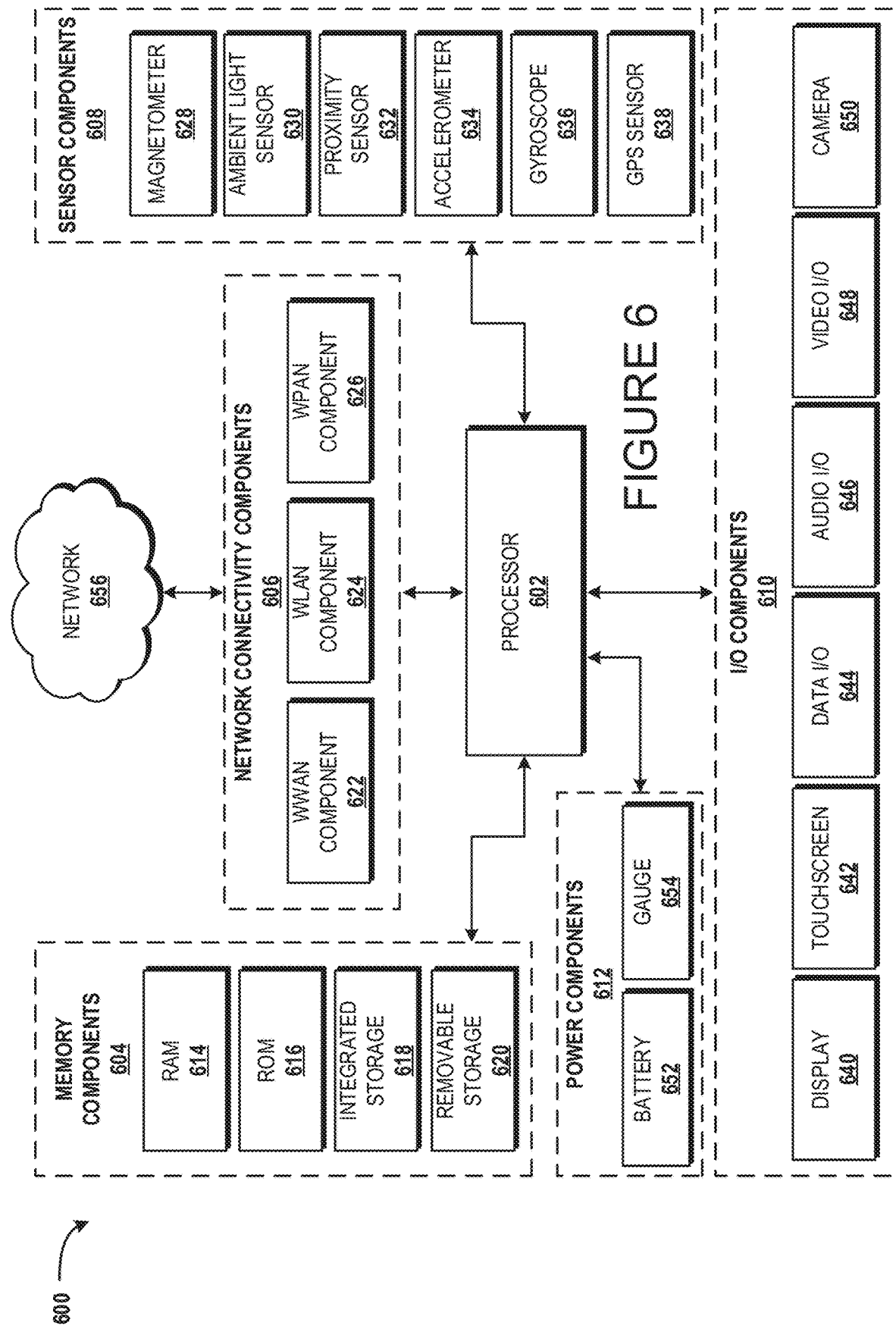
FIG. 6 is a computer architecture diagram illustrating a computing device architecture for a computing device capable of implementing aspects of the techniques and technologies presented herein.

Turning now to FIG. 6, an illustrative computing device architecture 600 for a computing device that is capable of executing various software components described herein for providing hosted third-party application experiences within storage service viewers. The computing device architecture 600 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 600 is applicable to any of the clients 506 shown in FIG. 5. Moreover, aspects of the computing device architecture 600 may be applicable to traditional desktop computers, portable computers (e.g., laptops, notebooks, ultra-portables, and netbooks), server computers, and other computer systems, such as described herein with reference to FIG. 4. For example, the single touch and multi-touch aspects disclosed herein below may be applied to desktop computers that utilize a touchscreen or some other touch-enabled device, such as a touch-enabled track pad or touch-enabled mouse.

The computing device architecture 600 illustrated in FIG. 6 includes a processor 602, memory components 604, network connectivity components 606, sensor components 608, input/output components 610, and power components 612. In the illustrated configuration, the processor 602 is in communication with the memory components 604, the network connectivity components 606, the sensor components 608, the input/output ("I/O") components 610, and the power components 612. Although no connections are shown between the individuals components illustrated in FIG. 6, the components can interact to carry out device functions. In some configurations, the components are arranged so as to communicate via one or more busses (not shown).

The processor 602 includes a central processing unit ("CPU") configured to process data, execute computer-executable instructions of one or more application programs, and communicate with other components of the computing device architecture 600 in order to perform various functionality described herein. The processor 602 may be utilized to execute aspects of the software components presented herein and, particularly, those that utilize, at least in part, a touch-enabled input.

In some configurations, the processor 602 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 602 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 602 is, or is included in, a system-on-chip ("SoC") along with one or more of the other components described herein below. For example, the SoC may include the processor 602, a GPU, one or more of the network connectivity components 606, and one or more of the sensor components 608. In some configurations, the processor 602 is fabricated, in part, utilizing a package-on-package ("PoP") integrated circuit packaging technique. The processor 602 may be a single core or multi-core processor.

The processor 602 may be created in accordance with an ARM architecture, available for license from ARM HOLDINGS of Cambridge, United Kingdom. Alternatively, the processor 602 may be created in accordance with an x86 architecture, such as is available from INTEL CORPORATION of Mountain View, Calif. and others. In some configurations, the processor 602 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 604 include a random access memory ("RAM") 614, a read-only memory ("ROM") 616, an integrated storage memory ("integrated storage") 618, and a removable storage memory ("removable storage") 620. In some configurations, the RAM 614 or a portion thereof, the ROM 618 or a portion thereof, and/or some combination the RAM 614 and the ROM 618 is integrated in the processor 602. In some configurations, the ROM 618 is configured to store a firmware, an operating system or a portion thereof (e.g., operating system kernel), and/or a bootloader to load an operating system kernel from the integrated storage 618 and/or the removable storage 620.

The integrated storage 618 can include a solid-state memory, a hard disk, or a combination of solid-state memory and a hard disk. The integrated storage 618 may be soldered or otherwise connected to a logic board upon which the processor 602 and other components described herein also may be connected. As such, the integrated storage 618 is integrated in the computing device. The integrated storage 618 is configured to store an operating system or portions thereof, application programs, data, and other software components described herein.

The removable storage 620 can include a solid-state memory, a hard disk, or a combination of solid-state memory and a hard disk. In some configurations, the removable storage 620 is provided in lieu of the integrated storage 618. In other configurations, the removable storage 620 is provided as additional optional storage. In some configurations, the removable storage 620 is logically combined with the integrated storage 618 such that the total available storage is made available as a total combined storage capacity. In some configurations, the total combined capacity of the integrated storage 618 and the removable storage 620 is shown to a user instead of separate storage capacities for the integrated storage 618 and the removable storage 620.

The removable storage 620 is configured to be inserted into a removable storage memory slot (not shown) or other mechanism by which the removable storage 620 is inserted and secured to facilitate a connection over which the removable storage 620 can communicate with other components of the computing device, such as the processor 602. The removable storage 620 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 604 can store an operating system. According to various configurations, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 606 include a wireless wide area network component ("WWAN component") 622, a wireless local area network component ("WLAN component") 624, and a wireless personal area network component ("WPAN component") 626. The network connectivity components 606 facilitate communications to and from the network 656 or another network, which may be a WWAN, a WLAN, or a WPAN. Although only the network 656 is illustrated, the network connectivity components 606 may facilitate simultaneous communication with multiple networks, including the network 404 of FIG. 4. For example, the network connectivity components 606 may facilitate simultaneous communications with multiple networks via one or more of a WWAN, a WLAN, or a WPAN.

The network 656 may be or may include a WWAN, such as a mobile telecommunications network utilizing one or more mobile telecommunications technologies to provide voice and/or data services to a computing device utilizing the computing device architecture 600 via the WWAN component 622. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 656 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 654 may be configured to provide voice and/or data communications with any combination of the above technologies. The network 656 may be configured to or adapted to provide voice and/or data communications in accordance with future generation technologies.

In some configurations, the WWAN component 622 is configured to provide dual-multi-mode connectivity to the network 656. For example, the WWAN component 622 may be configured to provide connectivity to the network 656, wherein the network 656 provides service via GSM and UMTS technologies, or via some other combination of technologies. Alternatively, multiple WWAN components 622 may be utilized to perform such functionality, and/or provide additional functionality to support other non-compatible technologies (i.e., incapable of being supported by a single WWAN component). The WWAN component 622 may facilitate similar connectivity to multiple networks (e.g., a UMTS network and an LTE network).

The network 656 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 624 is configured to connect to the network 656 via the WI-FI access points. Such connections may be secured via various encryption technologies including, but not limited, WI-FI Protected Access ("WPA"), WPA2, Wired Equivalent Privacy ("WEP"), and the like.

The network 656 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 626 is configured to facilitate communications with other devices, such as peripherals, computers, or other computing devices via the WPAN.

The sensor components 608 include a magnetometer 628, an ambient light sensor 630, a proximity sensor 632, an accelerometer 634, a gyroscope 636, and a Global Positioning System sensor ("GPS sensor") 638. It is contemplated that other sensors, such as, but not limited to, temperature sensors or shock detection sensors, also may be incorporated in the computing device architecture 600.

The magnetometer 628 is configured to measure the strength and direction of a magnetic field. In some configurations the magnetometer 628 provides measurements to a compass application program stored within one of the memory components 604 in order to provide a user with accurate directions in a frame of reference including the cardinal directions, north, south, east, and west. Similar measurements may be provided to a navigation application program that includes a compass component. Other uses of measurements obtained by the magnetometer 628 are contemplated.

The ambient light sensor 630 is configured to measure ambient light. In some configurations, the ambient light sensor 630 provides measurements to an application program stored within one the memory components 604 in order to automatically adjust the brightness of a display (described below) to compensate for low-light and high-light environments. Other uses of measurements obtained by the ambient light sensor 630 are contemplated.

The proximity sensor 632 is configured to detect the presence of an object or thing in proximity to the computing device without direct contact. In some configurations, the proximity sensor 632 detects the presence of a user's body (e.g., the user's face) and provides this information to an application program stored within one of the memory components 604 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 628 are contemplated.

The accelerometer 634 is configured to measure proper acceleration. In some configurations, output from the accelerometer 634 is used by an application program as an input mechanism to control some functionality of the application program. For example, the application program may be a video game in which a character, a portion thereof, or an object is moved or otherwise manipulated in response to input received via the accelerometer 634. In some configurations, output from the accelerometer 634 is provided to an application program for use in switching between landscape and portrait modes, calculating coordinate acceleration, or detecting a fall. Other uses of the accelerometer 634 are contemplated.

The gyroscope 636 is configured to measure and maintain orientation. In some configurations, output from the gyroscope 636 is used by an application program as an input mechanism to control some functionality of the application program. For example, the gyroscope 636 can be used for accurate recognition of movement within a 3D environment of a video game application or some other application. In some configurations, an application program utilizes output from the gyroscope 636 and the accelerometer 634 to enhance control of some functionality of the application program. Other uses of the gyroscope 636 are contemplated.

The GPS sensor 638 is configured to receive signals from GPS satellites for use in calculating a location. The location calculated by the GPS sensor 638 may be used by any application program that requires or benefits from location information. For example, the location calculated by the GPS sensor 638 may be used with a navigation application program to provide directions from the location to a destination or directions from the destination to the location. Moreover, the GPS sensor 638 may be used to provide location information to an external location-based service, such as E911 service. The GPS sensor 638 may obtain location information generated via WI-FI, WIMAX, and/or cellular triangulation techniques utilizing one or more of the network connectivity components 606 to aid the GPS sensor 638 in obtaining a location fix. The GPS sensor 638 may also be used in Assisted GPS ("A-GPS") systems.

The I/O components 610 include a display 640, a touchscreen 642, a data I/O interface component ("data I/O") 644, an audio I/O interface component ("audio I/O") 646, a video I/O interface component ("video I/O") 648, and a camera 650. In some configurations, the display 640 and the touchscreen 642 are combined. In some configurations two or more of the data I/O component 644, the audio I/O component 646, and the video I/O component 648 are combined. The I/O components 610 may include discrete processors configured to support the various interface described below, or may include processing functionality built-in to the processor 602.

The display 640 is an output device configured to present information in a visual form. In particular, the display 640 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 640 is a liquid crystal display ("LCD") utilizing any active or passive matrix technology and any backlighting technology (if used). In some configurations, the display 640 is an organic light emitting diode ("OLED") display. Other display types are contemplated.

The touchscreen 642, also referred to herein as a "touch-enabled screen," is an input device configured to detect the presence and location of a touch. The touchscreen 642 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 642 is incorporated on top of the display 640 as a transparent layer to enable a user to use one or more touches to interact with objects or other information presented on the display 640. In other configurations, the touchscreen 642 is a touch pad incorporated on a surface of the computing device that does not include the display 640. For example, the computing device may have a touchscreen incorporated on top of the display 640 and a touch pad on a surface opposite the display 640.

In some configurations, the touchscreen 642 is a single-touch touchscreen. In other configurations, the touchscreen 642 is a multi-touch touchscreen. In some configurations, the touchscreen 642 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 642. As such, a developer may create gestures that are specific to a particular application program.

In some configurations, the touchscreen 642 supports a tap gesture in which a user taps the touchscreen 642 once on an item presented on the display 640. The tap gesture may be used for various reasons including, but not limited to, opening or launching whatever the user taps. In some configurations, the touchscreen 642 supports a double tap gesture in which a user taps the touchscreen 642 twice on an item presented on the display 640. The double tap gesture may be used for various reasons including, but not limited to, zooming in or zooming out in stages. In some configurations, the touchscreen 642 supports a tap and hold gesture in which a user taps the touchscreen 642 and maintains contact for at least a pre-defined time. The tap and hold gesture may be used for various reasons including, but not limited to, opening a context-specific menu.

In some configurations, the touchscreen 642 supports a pan gesture in which a user places a finger on the touchscreen 642 and maintains contact with the touchscreen 642 while moving the finger on the touchscreen 642. The pan gesture may be used for various reasons including, but not limited to, moving through screens, images, or menus at a controlled rate. Multiple finger pan gestures are also contemplated. In some configurations, the touchscreen 642 supports a flick gesture in which a user swipes a finger in the direction the user wants the screen to move. The flick gesture may be used for various reasons including, but not limited to, scrolling horizontally or vertically through menus or pages. In some configurations, the touchscreen 642 supports a pinch and stretch gesture in which a user makes a pinching motion with two fingers (e.g., thumb and forefinger) on the touchscreen 642 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 642. As such, the above gestures should be understood as being illustrative and should not be construed as being limiting in any way.

The data I/O interface component 644 is configured to facilitate input of data to the computing device and output of data from the computing device. In some configurations, the data I/O interface component 644 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 646 is configured to provide audio input and/or output capabilities to the computing device. In some configurations, the audio I/O interface component 644 includes a microphone configured to collect audio signals. In some configurations, the audio I/O interface component 644 includes a headphone jack configured to provide connectivity for headphones or other external speakers. In some configurations, the audio I/O interface component 646 includes a speaker for the output of audio signals. In some configurations, the audio I/O interface component 644 includes an optical audio cable out.

The video I/O interface component 648 is configured to provide video input and/or output capabilities to the computing device. In some configurations, the video I/O interface component 648 includes a video connector configured to receive video as input from another device (e.g., a video media player such as a DVD or BLURAY player) or send video as output to another device (e.g., a monitor, a television, or some other external display). In some configurations, the video I/O interface component 648 includes a High-Definition Multimedia Interface ("HDMI"), mini-HDMI, micro-HDMI, DisplayPort, or proprietary connector to input/output video content. In some configurations, the video I/O interface component 648 or portions thereof is combined with the audio I/O interface component 646 or portions thereof.

The camera 650 can be configured to capture still images and/or video. The camera 650 may utilize a charge coupled device ("CCD") or a complementary metal oxide semiconductor ("CMOS") image sensor to capture images. In some configurations, the camera 650 includes a flash to aid in taking pictures in low-light environments. Settings for the camera 650 may be implemented as hardware or software buttons.

Although not illustrated, one or more hardware buttons may also be included in the computing device architecture 600. The hardware buttons may be used for controlling some operational aspect of the computing device. The hardware buttons may be dedicated buttons or multi-use buttons. The hardware buttons may be mechanical or sensor-based.

The illustrated power components 612 include one or more batteries 652, which can be connected to a battery gauge 654. The batteries 652 may be rechargeable or disposable. Rechargeable battery types include, but are not limited to, lithium polymer, lithium ion, nickel cadmium, and nickel metal hydride. Each of the batteries 652 may be made of one or more cells.

The battery gauge 654 can be configured to measure battery parameters such as current, voltage, and temperature. In some configurations, the battery gauge 654 is configured to measure the effect of a battery's discharge rate, temperature, age and other factors to predict remaining life within a certain percentage of error. In some configurations, the battery gauge 654 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

CONCLUSION

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computing system, comprising:
a processor; and
a memory in communication with the processor, the memory having computer-readable instructions stored thereupon that, when executed by the processor, cause the computing system to
store a plurality of files associated with a user identity having permissions to share and access the plurality of files, wherein at least one file of the plurality of files is associated with a file type;
determine an association between the file type and an interface address of a remote service;
receive a command to view contents of the at least one file associated with the file type;
cause the communication of the at least one file from the computing system to the remote service, wherein the interface address is configured to provide a viewer page showing the contents of the at least one file;
generate display page data comprising interface definitions for a display page having a details bar and a command bar, wherein the display page data comprises the interface address for causing a client computing device to receive the viewer page from the remote service, wherein the display page data is configured to display the viewer page in proximity to the details bar and the command bar;
communicate the display page data from the computing system to the client computing device; and
cause the client computing device to render the display page on a display device based on the display page data, wherein the client computing device queries the remote service utilizing the interface address, wherein the client computing device receives the viewer page data from the remote service in response to the query, and displays the viewer page showing the contents of the at least one file in proximity to the details bar and the command bar, wherein the command bar comprises at least one command for editing the at least one file, and wherein the at least one command for editing the at least one file causes the remote service to generate an updated file based on the at least one command and communicate the updated file to the computing system for storage.

2. The computing system of claim 1, wherein determining the association between the file type and the interface address of the remote service comprises receiving initialization data from the remote service, the initialization data indicating the association between the file type and the interface address.

3. The computing system of claim 1, wherein determining the association between the file type and the interface address of the remote service comprises receiving initialization data from the client computing device, the initialization data indicating the association between the file type and the interface address.

4. A computer-implemented method, comprising:
receiving a plurality of files for storage in a file data store, wherein individual files of the plurality of files are associated with a file type;
determining an association between the file type and an interface address of a remote service;
receiving, at a computing system, a command to view contents of a file associated with the file type;
transmitting the file from the computing system to a remote service, wherein the interface address is configured to provide a viewer page showing the contents of the file;
generating display page data comprising interface definitions for a display page having a description of one or more attributes of the file, wherein the display page data comprises the interface address for causing a client computing device to receive the viewer page from the remote service, wherein the display page data is configured to display the viewer page in proximity to the description of one or more attributes of the file; and
transmitting the display page data from the computing system to the client computing device, wherein communicating the display page data from the computing system to the client computing device causes the client computing device to render the display page on a display device based on the display page data, wherein the client computing device queries the remote service utilizing the interface address, wherein the client computing device receives the viewer page data from the remote service in response to the query, and displays the viewer page showing the contents of the file concurrently with the description of one or more attributes of the file, wherein the viewer page comprises a command for causing the remote service to edit the file, wherein the command for editing the file causes the remote service to communicate an updated file that is edited based on the command to the computing system for storage.

5. The method of claim 4, wherein the display page data comprising interface definitions for the display page having a details bar, wherein the display page data is configured to display the viewer page in proximity to the details bar on the display page, and wherein the details bar displays the description of the one or more attributes of the file.

6. The method of claim 4, wherein the display page data comprising interface definitions for the display page having a details bar, wherein the display page data is configured to display the viewer page concurrently with the details bar on the display page, and wherein the details bar displays the description of the one or more attributes of the file.

7. The method of claim 4, wherein the display page data comprising interface definitions for the display page having a command bar, wherein the display page data is configured to display the viewer page in proximity to the command bar on the display page.

8. The method of claim 7, wherein the command bar comprises a graphical user interface element configured to receive commands for modifying the file.

9. The method of claim 4, wherein the display page data comprising interface definitions for the display page having a command bar, wherein the display page data is configured to display the viewer page concurrently with the command bar on the display page.

10. The method of claim 4, wherein determining the association between the file type and the interface address comprises receiving initialization data from the remote service, the initialization data indicating the association between the file type and the interface address.

11. The method of claim 4, wherein determining the association between the file type and the interface address of the remote service comprises receiving initialization data from the client computing device, the initialization data indicating the association between the file type and the interface address.

12. The method of claim 4, further comprising:
receiving an updated version of the file from the remote service; and
storing the updated version of the file in a file data store associated with the computing system.

13. The method of claim 12, wherein the updated version of the file is received from the remote service in response to a modification of the file, wherein the modification of the file is caused by an edit command initiated by the client computing device.

14. One or more computer storage media storing instructions that, when executed by one or more processing units, cause a computing system to perform operations comprising:

receiving a plurality of files for storage in a file data store, wherein individual files of the plurality of files are associated with a file type;
determining an association between the file type and an interface address of a remote service;
receiving, at the computing system, a command to view contents of a file associated with the file type;
transmitting the file from the computing system to a remote service, wherein the interface address is configured to provide a viewer page showing the contents of the file;
generating display page data comprising interface definitions for a display page having a description of one or more attributes of the file, wherein the display page data comprises the interface address for causing a client computing device to receive the viewer page from the remote service, wherein the display page data is configured to display the viewer page in proximity to the description of one or more attributes of the file; and
transmitting the display page data from the computing system to the client computing device, wherein communicating the display page data from the computing system to the client computing device causes the client computing device to render the display page on a display device based on the display page data, wherein the client computing device queries the remote service utilizing the interface address, wherein the client computing device receives the viewer page data from the remote service in response to the query, and displays the viewer page showing the contents of the file concurrently with the description of one or more attributes of the file, wherein the viewer page comprises a command for causing the remote service to modify the file, wherein the command for modifying the file causes the remote service to communicate an updated file that is modified based on the command to the computing system for storage.

15. The one or more computer storage media of claim 14, wherein the display page data comprising interface definitions for the display page having a details bar, wherein the display page data is configured to display the viewer page concurrently with the details bar on the display page, and wherein the details bar displays the description of the one or more attributes of the file.

16. The one or more computer storage media of claim 14, wherein the display page data comprising interface definitions for the display page having a command bar, wherein the display page data is configured to display the viewer page concurrently with the command bar on the display page, wherein the command bar comprises a graphical user interface elements configured to receive commands for modifying the file.

17. The one or more computer storage media of claim 14, wherein determining the association between the file type and the interface address comprises receiving initialization data from the remote service, the initialization data indicating the association between the file type and the interface address.

18. The one or more computer storage media of claim 14, wherein determining the association between the file type and the interface address of the remote service comprises receiving initialization data from the client computing device, the initialization data indicating the association between the file type and the interface address.

* * * * *